United States Patent
Ohwe (10) Patent No.: US 7,570,459 B2
(45) Date of Patent: Aug. 4, 2009

(54) RAMP LOADING UNIT AND DRIVE HAVING THE SAME

(75) Inventor: Takeshi Ohwe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 11/212,588

(22) Filed: Aug. 29, 2005

(65) Prior Publication Data

US 2006/0268462 A1 Nov. 30, 2006

(30) Foreign Application Priority Data

May 31, 2005 (JP) ............................. 2005-160078

(51) Int. Cl.
G11B 5/54 (2006.01)

(52) U.S. Cl. ................... 360/254.8; 360/245.3

(58) Field of Classification Search ............. 360/254.8, 360/245.3, 255, 254.9, 254.7, 245.5
See application file for complete search history.

(56) References Cited

U.S. PATENT DOCUMENTS

| | | | | |
|---|---|---|---|---|
| 5,189,575 A * | 2/1993 | Onooka et al. | ............. | 360/255 |
| 5,585,980 A * | 12/1996 | Boutaghou | ............... | 360/255 |
| 5,625,514 A * | 4/1997 | Kubo et al. | ............. | 360/254.8 |
| 5,862,018 A * | 1/1999 | Vera et al. | ............... | 360/255.9 |
| 6,226,154 B1 * | 5/2001 | Albrecht | ............... | 360/254.8 |
| 6,292,333 B1 * | 9/2001 | Blumentritt et al. | ........ | 360/254.8 |
| 6,538,850 B1 * | 3/2003 | Hadian et al. | ............. | 360/245.7 |
| 6,538,851 B1 | 3/2003 | Sasaki | ................... | 360/254.8 |
| 6,721,134 B1 * | 4/2004 | Pottebaum et al. | ........ | 360/254.8 |
| 7,010,847 B1 * | 3/2006 | Hadian et al. | ............. | 29/603.03 |
| 7,085,104 B1 * | 8/2006 | Hadian et al. | ............. | 360/245.7 |
| 2001/0043441 A1 * | 11/2001 | Kishi et al. | ............. | 360/254.8 |
| 2003/0169536 A1 * | 9/2003 | Suzuki | .................. | 360/255 |
| 2004/0130821 A1 | 7/2004 | Ohwe et al. | ............. | 360/235.8 |
| 2005/0207066 A1 * | 9/2005 | Kobayashi et al. | .......... | 360/255 |

FOREIGN PATENT DOCUMENTS

| | | |
|---|---|---|
| JP | 03-128879 | 5/1991 |
| JP | 11-110933 | 4/1999 |
| JP | 2001-014820 | 1/2001 |
| JP | 2001-195852 | 7/2001 |
| JP | 2003-141841 | 5/2003 |

* cited by examiner

Primary Examiner—Brian E Miller
(74) Attorney, Agent, or Firm—Kratz, Quintos & Hanson, LLP (57) ABSTRACT

A ramp loading unit includes a holding part that holds, outside a recording medium, a lift tab connected to a suspension that supports a head used to record information in or reproduce the information from the recording medium, and a sliding part to which the lift tab elastically contacts in loading the head onto the recording medium and in unloading the head from the recording medium, wherein the sliding part includes an inclined part that projects at least partially above the recording medium, inclines relative to a surface of the recording medium, and partially changes an inclination angle of the inclined part.

7 Claims, 9 Drawing Sheets

RAMP LOADING UNIT AND DRIVE HAVING THE SAME

This application claims the right of foreign priority under 35 U.S.C. §119 based on Japanese Patent Application No. 2005-160078 filed on May 31, 2005, which is hereby incorporated by reference herein in its entirety as if fully set forth herein.

BACKGROUND OF THE INVENTION

The present relates generally to a ramp loading unit that holds a head outside a recording medium, and a drive having the ramp loading unit. The inventive drive is suitable, for example, for a hard disc drive ("HDD").

Available electronic information contents have explosively increased with the recent rapid technology developments, as in the Internet. Thus, larger-capacity magnetic storages, typified by HDDs, have been increasingly demanded to store such a large amount of information.

A slider mounted with a head floats above a disc for recording and reproducing in the HDD. As a relationship between the slider and the disc at the time of activation and halt of the disc, referred to as an interface, there are a contact start stop ("CSS") system in which the slider contacts the disc when the disc stops and starts rotating, and a ramp or dynamic loading system in which the slider retreats from the disc at the time of stopping the disc and is held by a holder called a ramp.

The CSS system would, however, cause crashes or damage the disc if frictions increase at the time of stopping and sliding. In addition, since the slider is likely to stick to the disc, the CSS system requires a texture process that forms fine convexes and concaves on the disc surface so as to prevent the absorption. This texture process increases cost, and becomes difficult particularly due to the reduced floating amount of the slider in the recent higher recording density and the associative demands for the flat disc surface.

Accordingly, the ramp loading system has recently attracted attentions. In the ramp loading system, a non-contact between the slider and the disc when the disc starts and stops rotations causes no friction that would otherwise damage the disc or absorptions between them. An additional advantage is that the ramp loading system requires no texture process and reduces the head floating amount. In the ramp loading system, a lift tab provided at the tip of a suspension that supports the slider slides on a sliding surface on the ramp while contacting the ramp with an elastic force in loading the slider on the disc and unloading the slider from the disc.

In the ramp loading system, the ramp projects above the outer circumference of the disc. Without this projection, the slider drops off between the ramp and disc in loading and unloading. On the other hand, the projection amount should be as small as possible because the projection reduces the recording area on the disc. Although it is conceivable that the projection having a large inclination angle reduces the projection amount, this configuration might cause high-speed collisions and damages between the lift tab and ramp during unloading.

BRIEF SUMMARY OF THE INVENTION

Accordingly, it is an exemplary object of the present invention to provide a ramp loading unit and a drive having the same, which prevent damages of the ramp and lift tab, and maintain a wide effective recording area on a recording medium.

A ramp loading unit according to one aspect of the present invention includes a holding part that holds, outside a recording medium, a lift tab connected to a suspension that supports a head used to record information in or reproduce the information from the recording medium, and a sliding part to which the lift tab elastically contacts in loading the head onto the recording medium and in unloading the head from the recording medium, wherein the sliding part includes an inclined part that projects at least partially above the recording medium, inclines relative to a surface of the recording medium, and partially changes an inclination angle of the inclined part. According to this ramp loading unit, the partially changing inclination angle of the inclined part makes the horizontal distance of the inclined part shorter than that in the conventional ramp loading unit that maintains the inclination angle constant. As a result, the shorter horizontal distance by which the projected part projects above the recording medium reduces the recording area on the recording medium invaded by the inclined part. In addition, the head can be more quickly loaded onto and unloaded from the recording medium.

The inclined part may have first and second positions in a direction from the recording medium to the holding part, the first position being closer to the recording medium than the second position, and the inclination angle at the second position being greater than the inclination angle at the first position. The first and second positions are arranged, for example, between a position where the lift tab first contacts the sliding part and a position at which the head cannot record the information in or reproduce the information from the recording medium in unloading the head from the recording medium. This configuration reduces not only the impact when the lift tab contacts the inclined part in unloading, but also the projection amount by which the inclined part projects above the recording medium. Preferably, the sliding part has the inclination angle of about 0° at a position where the lift tab first contacts the sliding part in unloading the head from the recording medium. This configuration reduces the impact when the lift tab contacts the inclined part in unloading. The inclined part forms a line, a curve or a combination of plural curves when projected onto a plane parallel to a longitudinal direction of the inclined part. The inclined part preferably has a maximum inclination angle of 50° or smaller. When the inclined part of the ramp has a greater inclination angle, the inclined part contacts the edge of the lift tab and prevents smooth loading and unloading.

A ramp loading unit according to another aspect of the present invention includes a holding part that holds a lift tab outside a recording medium, the lift tab being inclined relative to a surface of the recording medium and connected to a suspension that is rotatable around a shaft and supports a head used to record information in or reproduce the information from the recording medium, and a sliding part to which the lift tab elastically contacts in loading the head onto the recording medium and in unloading the head from the recording medium, wherein the sliding part when projected onto a plane perpendicular to the shaft is so shaped that a locus of a contact position between the lift tab and the sliding part when projected onto the plane shifts from a circle whose center is located at the shaft when the locus starts with a position where the lift tab first contacts the sliding part. According to this ramp loading unit, the position where the lift tab contacts the sliding part displaces on the lift tab. Therefore, a properly set inclination of the lift tab can make shorter the horizontal distance of the projection of the sliding part above the recording medium than that in the conventional ramp loading apparatus that fixes, on the lift tab, the contact position between the lift tab and the sliding part. As a result, the shorter horizontal distance makes smaller the recording area on the recording medium invaded by the inclined part than the conventional one. In addition, the head can be more quickly loaded onto and unloaded from the recording medium.

The sliding part may be flat between the position where the lift tab first contacts the sliding part and a position at which the head cannot record the information in or reproduce the information from the recording medium in unloading the head from the recording medium. This configuration reduces the impact when the lift tab contacts the inclined part in unloading.

The drive having the above ramp loading unit, such as a magnetic disc drive and a magneto-optic disc drive, constitutes another aspect of the present invention.

Other objects and further features of the present invention will become readily apparent from the following description of the embodiments with reference to accompanying drawings.

DETAILED DESCRIPTION OF PREFERRED EMBODIMENT

Figure 1:
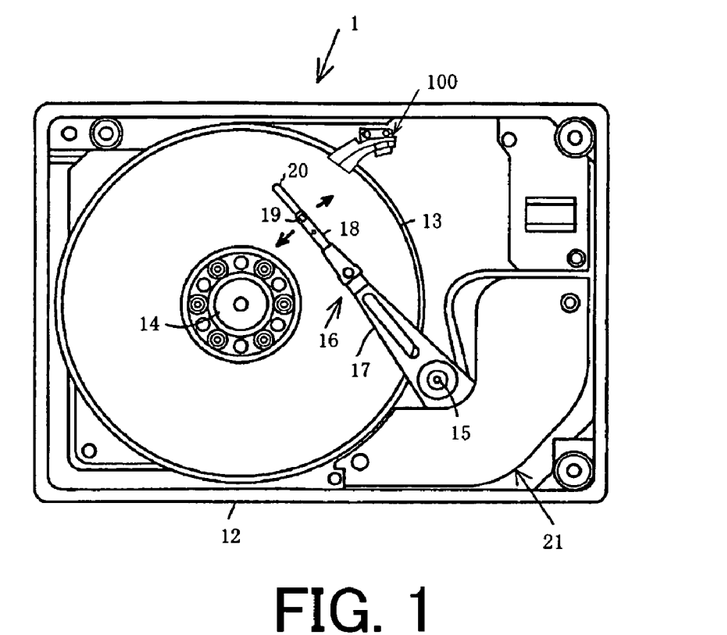
FIG. 1 is a plane view of an internal structure of a hard disc drive ("HDD") as one exemplary drive according to one aspect of the present invention.

A description will be given of a HDD 1 according to one embodiment of the present invention with reference to the accompanying drawings. The HDD 1 includes, as shown in FIG. 1, one or more magnetic discs 13 as a recording medium, a spindle motor 14, a magnetic head part, and a ramp loading unit 100 in a housing 12. Here, FIG. 1 is a schematic plane view of the HDD 1's internal structure. The number of magnetic discs 13 is illustratively one in this embodiment.

The housing 12 is made, for example, of aluminum die casting or stainless steel, and has a rectangular parallelepiped shape to which a cover (not shown) for sealing the internal space is coupled. Each magnetic disc 13 in this embodiment has a high recording density, such as 100 Gb/in$^2$ or higher, and is mounted on a spindle of the spindle motor 14.

The spindle motor 14 rotates the magnetic disc 13 at a high speed, such as 10,000 rpm, and includes a brushless DC motor (not shown) and a spindle as its rotor part. For example, when two magnetic discs 13 are used, a disc, a spacer, a disc, and a clamp are stacked in this order on the spindle, and fixed by a bolt engaged with the spindle. Unlike this embodiment, the magnetic disc 13 may be a disc having a hub without a center hole, and the spindle may rotate the disc through the hub.

The magnetic head part includes a slider 19, and an actuator 21 that serves as a mechanism for positioning and driving the slider 19.

Figure 2:
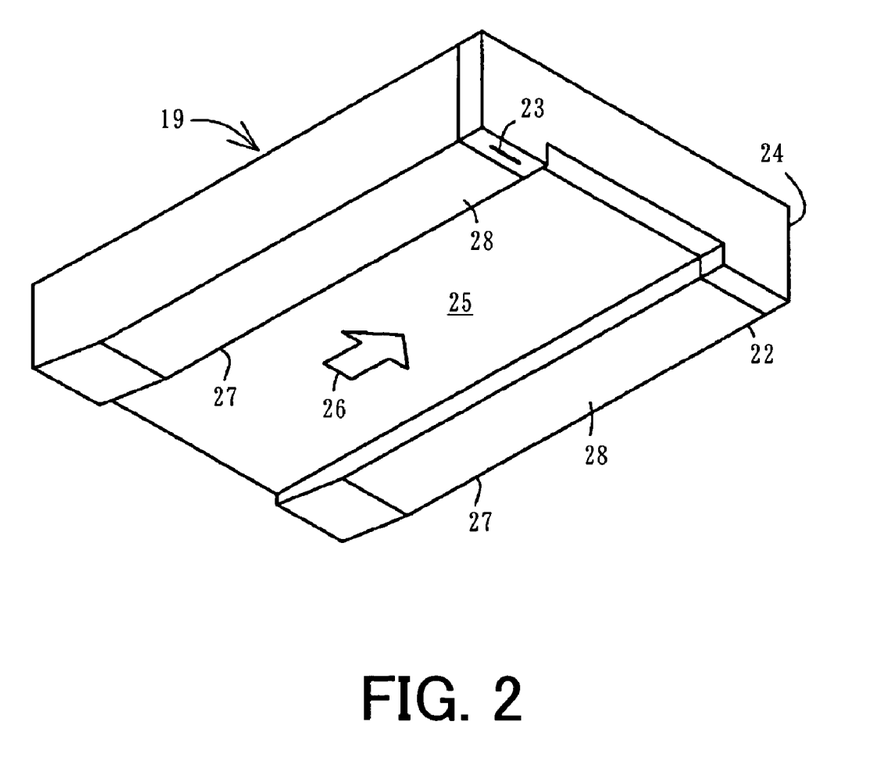
FIG. 2 is an enlarged perspective view of a slider in the HDD shown in FIG. 1.

The slider 19 includes, as shown in FIG. 2, a slider body 22 having an approximately rectangular parallelepiped shape made of $Al_2O_3$—TiC (altic), and a head-device built-in film 24 united with at an air outflow end of the slider body 22 and made of $Al_2O_3$ (alumina). The film 24 contains a built-in read/write head 23. Here, FIG. 2 is an enlarged perspective view of the slider 19. The slider body 22 and head-device built-in film 24 define a floatation surface 25 opposing to a medium, i.e., the magnetic disc 13, for catching air current 26 generated from the rotating magnetic disc 13.

A pair of rails 27 extend on the floatation surface 25 from an air inflow end to the air outflow end. A so-called airbearing surface (referred to as "ABS" hereinafter) 28 is defined at a top surface of each rail 27. The buoyancy is generated at the ABS 28 according to the act of the air current 26. The head 23 embedded in the head-device built-in film 24 exposes at the ABS 28. The floatation system of the slider 19 is not limited to this form, but may use a known dynamic pressure lubricating system, a known static pressure lubricating system, a known piezoelectric control system, and any other known floatation system. As discussed below, this embodiment uses a dynamic or ramp loading system that retreats or unloads the slider 19 from the disc 13 before the disc 13 stops, holds the slider 19 on the ramp loading unit 100 outside the disc 13 in a non-contact manner between the slider 19 and the disc 13, and drops or loads the slider 19 from the holding part onto the disc 13 in running the disc 13.

The head 23 includes a magnetoresistive ("MR" hereinafter)/inductive composite head that contains an inductive head device for writing binary information into the magnetic disc 13 using a magnetic field induced by a conductive coil pattern (not shown), and a MR head device for reading resistance as binary information changing according to a magnetic field generated by the magnetic disc 13. The MR head device may use any type, such as a giant magnetoresistive ("GMR") type including both a Current in Plane ("CIP") structure and a Current Perpendicular to Plane ("CPP") structure, a tunneling magnetoresistive type ("TMR"), and an anisotropic magnetoresistive ("AMR") type.

Turning back to FIG. 1, the actuator 21 includes a voice coil motor (not shown in FIG. 1), a support shaft 15, and a carriage 16.

The voice coil motor includes can use any technology known in the art, and a detailed description thereof will be omitted. For example, the voice coil motor includes a permanent magnet fixed onto an iron plate fixed in the housing 12, and a mobile magnet fixed onto the carriage 16. The support shaft 15 is inserted into a cylindrical hollow in the carriage 16, and arranged so that it extends perpendicular to the paper surface in FIG. 1 in the housing 12.

The carriage 16 includes a rigid arm 17 that can rotate or swing around the support shaft 15, and a suspension 18 that is attached to a tip of the corresponding arm 17 and extends forward from the arm 17. The suspension 18 can be, for example, a Watlas type suspension made of stainless steel, which uses a gimbal spring (not shown) to cantilever the slider 19 and a lift tab 20 at the tip. The suspension 18 has a wiring part connected to the slider 19 via gold ball bonding ("GBB"). FIG. 1 omits the wiring part. The sense current, read-in data, and read-out data are supplied and output between the head 23 and the wiring part through the GBB connections. The suspension 18 applies an elastic force to the slider 19 and the lift tab 20 against the surface of the magnetic disc 13.

The lift tab 20 extends along the center axis of the suspension 18 from the slider 19 opposing to the support shaft 15, and is engageable with the ramp loading unit 100. The lift tab 20 has a boat shape that slides on a sliding surface 160, which will be described later and, for example, is integrated with the suspension 18 and made of the same material as that of the suspension 18. The lift tab 20 slides on the ramp loading unit 100 to load and unload the slider 19. The lift tab 20 loads the slider 19 from the ramp loading unit 100 onto the magnetic disc 13 after the magnetic disc 13 starts driving, and unloads the slider 19 from the magnetic disc 13 to the ramp loading unit 100 so as to hold the slider 19 on the ramp loading unit 100 before the magnetic disc 13 stops driving.

Figure 3:
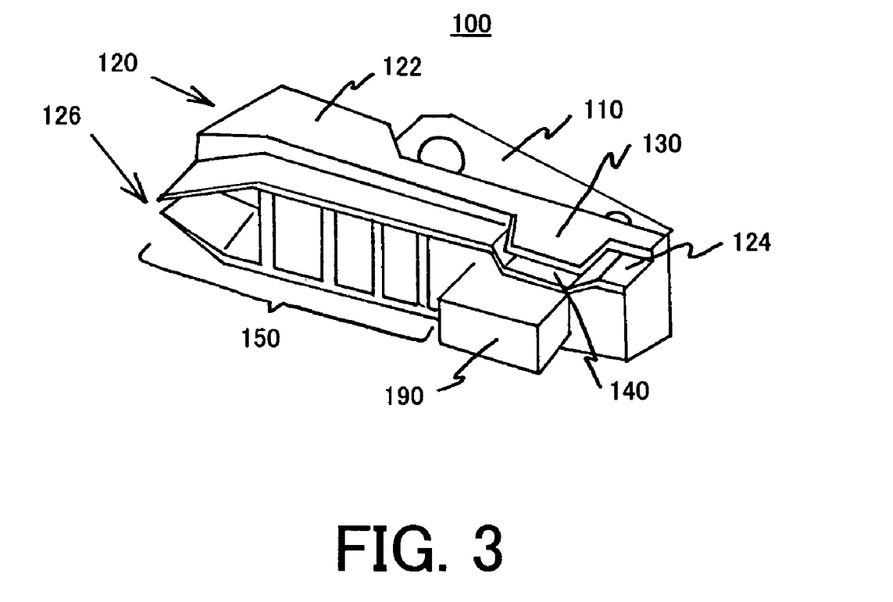
FIG. 3 is an enlarged perspective view of the ramp loading unit in the HDD shown in FIG. 1.
Figure 4:
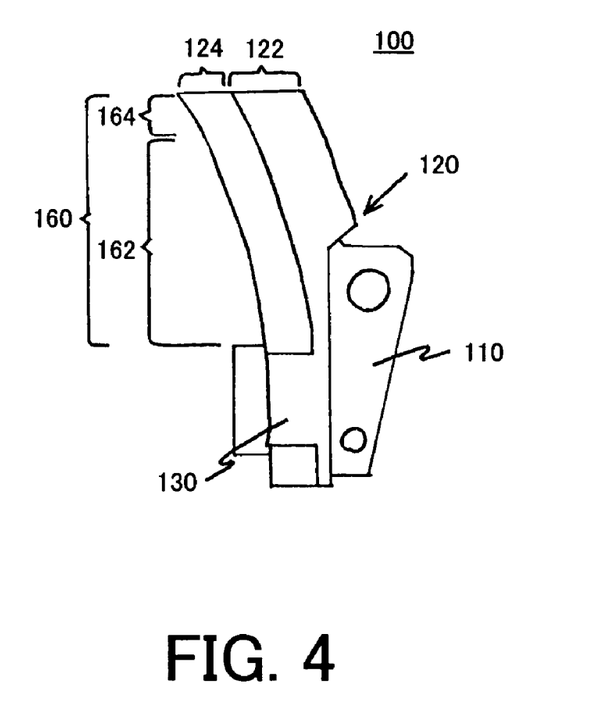
FIG. 4 is an enlarged plane view of the ramp loading unit in the HDD shown in FIG. 1.

Referring to FIGS. 1, 3 and 4, the ramp loading unit 100 is provided outside or near the outermost circumference of the magnetic disc 13 and partially projects from the disc 13. Here, FIGS. 3 and 4 are enlarged perspective and plane views of the ramp loading unit 100. For description purpose of this embodiment, the ramp loading unit 100 used for both sides of one magnetic disc 13 is discussed, but the present invention is not limited to this embodiment.

Figure 9:
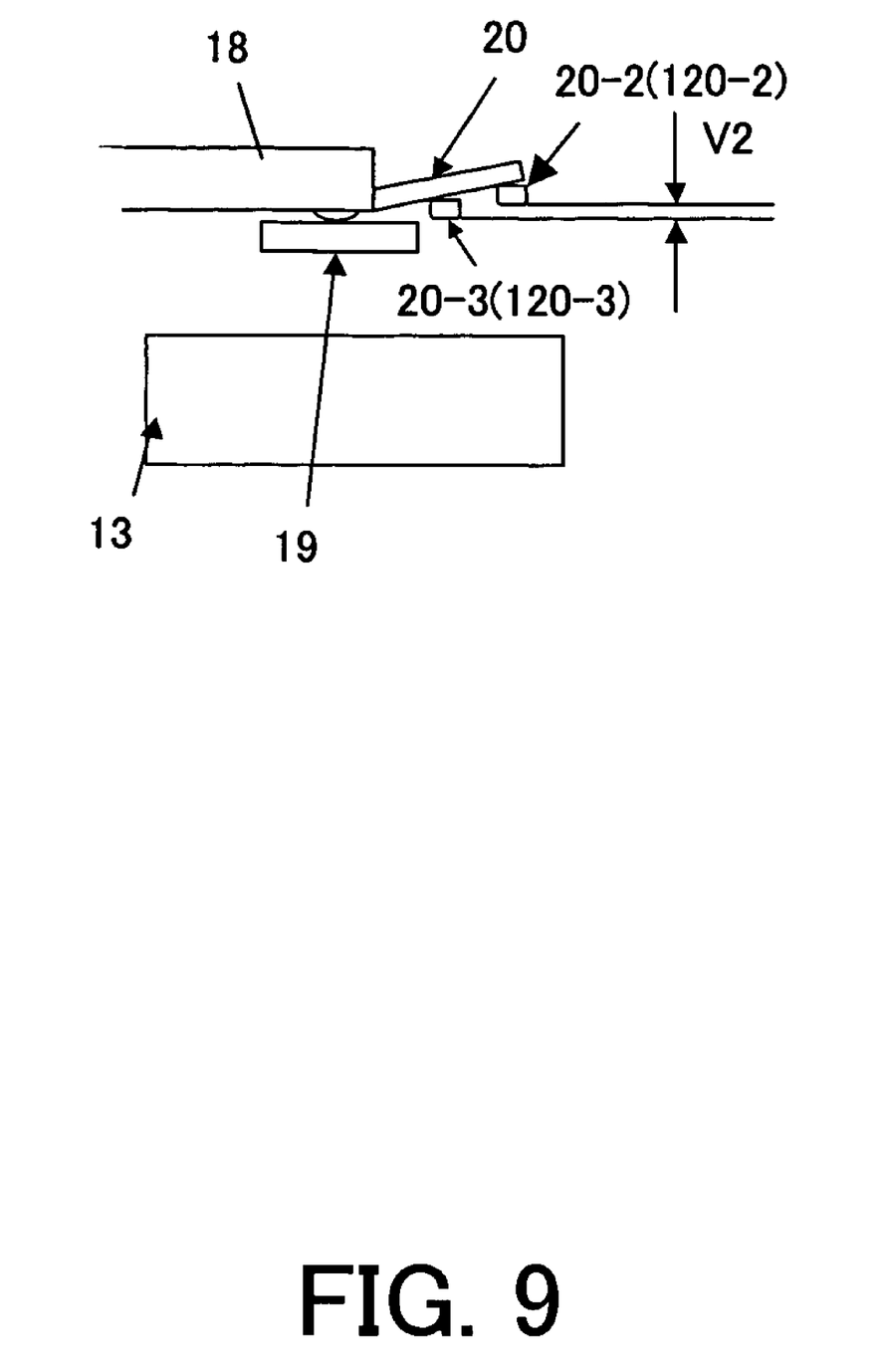
FIG. 9 is a schematic sectional view for explaining an operation when the lift tab shown in FIG. 7 moves clockwise on the ramp shown in FIG. 8.

Referring to FIGS. 3 and 4, the ramp loading unit 100 includes a fixture part 110 fixed on a bottom wall of the housing 12 via screws, and a ramp 120 coupled with the fixture part 110 outside the magnetic disc 13. The ramp 120 includes a base 122 coupled with the fixture part 110, and a guide part 124 that guides and holds the lift tab 20, and contacts the lift tab 20 slidably. The outer circumference of the magnetic disc 13 is partially inserted into a U-shaped groove 126 at the top of the guide part 124. As shown in FIG. 9, which will be described later, the contact position between the lift tab 20 and the ramp 120 can be located at the proximal side of a connection part between the lift tab 20 and the suspension 18. The guide part 124 in FIG. 4 can have a sufficient width in FIG. 4.

Figure 5:
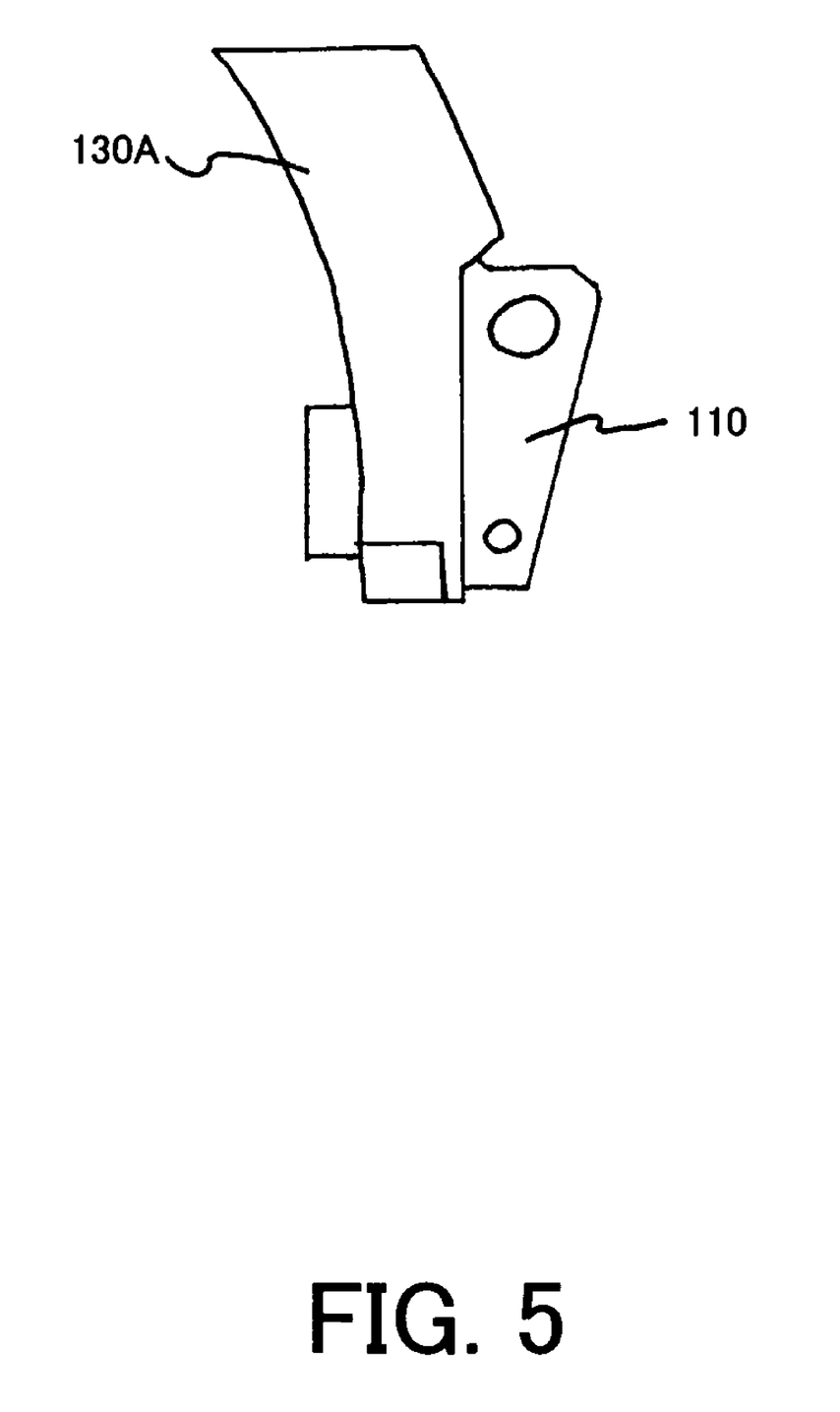
FIG. 5 is an enlarged perspective view of a variation of the ramp loading unit shown in FIG. 4.

The base 122 includes a cover 130 that prevents the vibrating lift tab 20 from escaping from a holding part 140, which will be described later. An alternative embodiment shown in FIG. 5 replace the cover 130 with a cover 130A that extends over the sliding surface 160 and prevents the lift tab 20 from vibrating on the convex and concave sliding surface 160 and escaping from the sliding surface 160. Thereby, the ramp loading unit 100 can prevent the slider 19 from colliding with the magnetic disc 13 when the slider 19 is loaded over the magnetic disc 13 while the lift tab 20 vibrates. Here, FIG. 5 is a plane view of a variation of the cover 130 shown in FIG. 4.

The guide 124 includes a holding part 140, a sliding part 150, and a pressure plate 190. While the holding part 140 and the sliding surface 160 are also formed at the lower side of the guide part 124 and used for another lift tab (not shown), only the upper side is addressed for description convenience.

The holding part 140 is a dent that holds the lift tab 20 that supports the slider 19. The holding part 140 is a home position for the lift tab 20 in the ramp 120. While a dent shape of the holding part 140 is a U-shape that slightly opens at both sides in this embodiment, other shapes, such as a V shape, may be used.

The sliding part 150 has a sliding surface 160 arranged on such a level that the lift tab 20 contacts the sliding surface 160 with a predetermined elastic force. The sliding surface 160 has, as shown in FIG. 4, an arc shape with a predetermined width corresponding to an arc locus drawn by the lift tab 20, and includes a flat part 162 and an inclined part 164. The flat part 162 is connected to the holding part 140, and extends parallel to a surface of the magnetic disc 13. The inclined surface 164 that inclines from the flat part 162 to the magnetic disc 13 partially projects above the magnetic disc 13.

Figure 6:
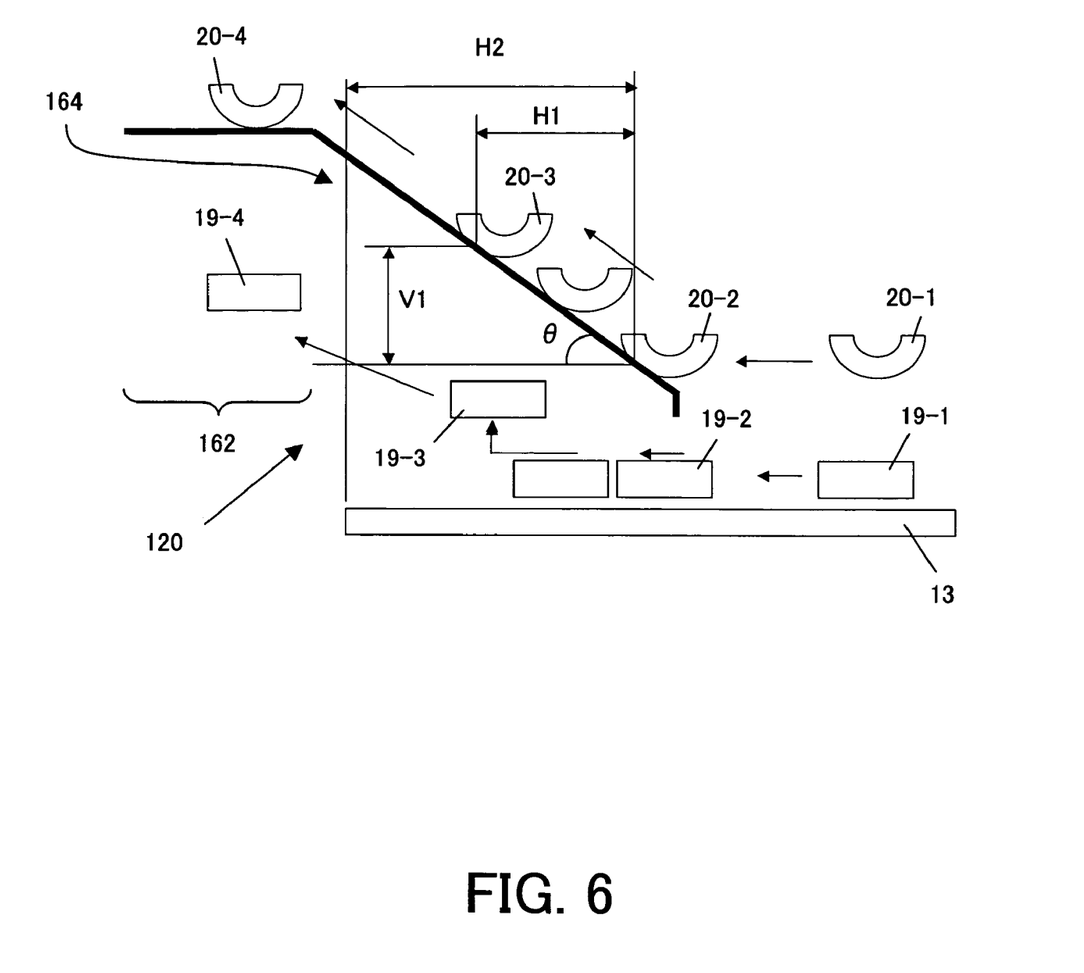
FIG. 6 is a schematic sectional view showing a positional relationship among a ramp, a lift tab, and a slider shown in FIG. 1.

Referring now to FIG. 6, a detailed description will be given of a relationship among the lift tab 20, the slider 19, and the sliding surface 160 of the ramp 120. Here, FIG. 6 is a schematic sectional view showing a positional relationship among the lift tab 20, the slider 19, and the sliding surface 160. In FIG. 6, 19-1 to 19-4 denote positions of the slider 19, 20-1 to 20-4 denote positions of the lift tab 20.

While the slider 19 is loaded on the disc 13, the slider 19 floats over the disc 13 with a minute interval, and the lift tab 20 is spaced from the surface of the disc 13 while located at the position 20-1 as a predetermined height.

The lift tab 20 that is being unloaded contacts the inclined part 164 first at the position 20-2, while the slider 19 at that time is located at the position 19-2. The position 19-2 is as high as the position 19-1 from the surface of the disc 13.

As the suspension 18 moves further to the outer circumference of the disc 13, the lift tab 20 goes up along the inclined part 164. At this time, the suspension 18 generates a lifting force for lifting up the slider 19, and the force increases as the lift tab 20 climbs the inclined part 164. The force generated when the lift tab 20 ascends by a predetermined vertical distance V1 after the lift tab 20 contacts the inclined part 164 exceeds the compression force for compressing the slider 19 against the disc 13 with respect to a floating force of the slider 19. As a result, the slider 19 separates from the disc 13. The lift tab 20 at this time is located at the position 20-3, while the slider 19 is located at the position 19-3.

Thereafter, the lift tab 20 further ascends along the inclined part 164, and moves to the flat part 162. The lift tab 20 at this time is located at the position 20-4, while the slider 19 is located at the position 19-4.

When the slider 19 contacts the outer edge of the disc 13, at least one of them get damages and the apparatus's reliability deteriorates. Therefore, a horizontal distance H1 between the position 20-2 and the position 20-3 of the lift tab 20 must be smaller than a horizontal distance H2 between the position 20-2 of the lift tab 20 and the outer edge part of the disc 13. When the inclined part 164 has a constant inclination angle $\theta$, the horizontal distance H1 is expressed with the vertical distance V1 as H1=V1/tan θ. The projection amount by which the inclined part 164 projects above the disc 13 depends upon the horizontal distance H1. This projection is necessary to prevent damages of the slider 19 and/or the disc 13, but decreases the recording area of the disc 13. Therefore, the horizontal distance H1 must be as small as possible to maintain the projection amount small.

In this respect, it is conceivable to increase the inclination angle θ of the inclined part 164, but this would cause the lift tab 20 to collide with the inclined part 164 at a high speed in unloading and they might get damaged.

In prior art, the sliding surface 160 in FIG. 4 forms an arc that has a center at the center of the shaft 15. When the locus of the contact position between the lift tab 20 and the ramp 120 is projected onto the plane perpendicular to the shaft 15, the projected locus is the arc whose center is located at the center of the shaft 15. The lift tab 20 is horizontal to the disc 13, and the contact position between the lift tab 20 and the ramp 120 is fixed on the lift tab 20 even when the suspension 18 moves to the outer circumference of the disc 13. On the other hand, this embodiment allows the contact position between the lift tab 20 and the ramp 120 to move to the proximal side of the lift tab 20 as the suspension 18 moves to the outer circumference of the disc 13. In order to realize this action, this embodiment shifts the locus of the contact position between the lift tab 20 and the ramp 120, when projected onto the plane perpendicular to the shaft 15, from the circle whose center is located at the center of the shaft 15.

Figure 7:
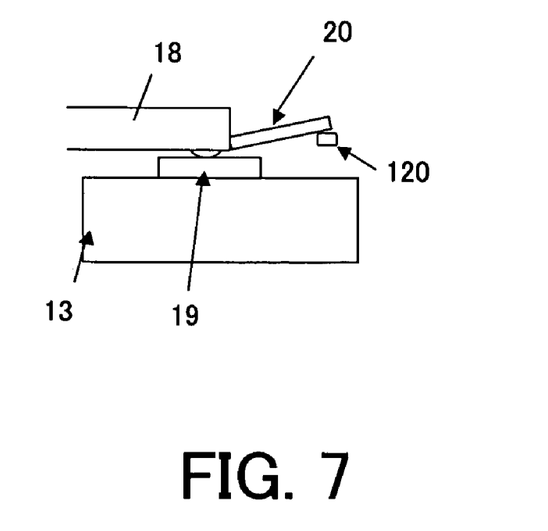
FIG. 7 is a schematic sectional view showing a positional relationship between the lift tab and the ramp applicable to the HDD shown in FIG. 1.
Figure 8:
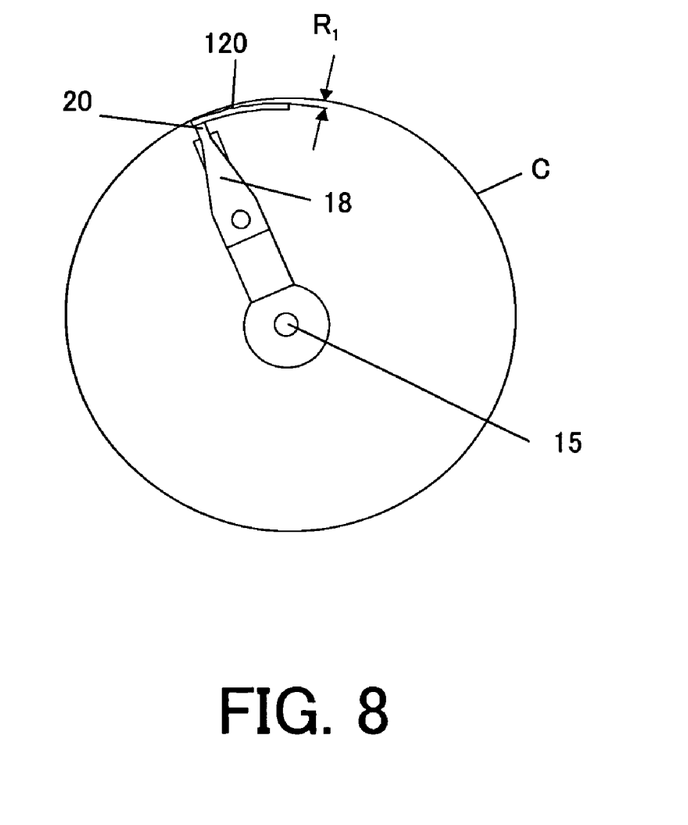
FIG. 8 is a schematic sectional view showing a positional relationship between the ramp and a shaft of a carriage applicable to the lift tab shown in FIG. 7.

Referring now to FIGS. 7 to 9, a description will be given of one embodiment of the present invention. In this embodiment, the distal end of the ramp 120 displaces by $R_1$ toward the inside of the circle C that has a center of the center of the shaft 15, as shown in FIG. 8, and the locus of the contact position between the lift tab 20 and the ramp 120 from the position 20-2 is shifted, when projected onto the plane perpendicular to the shaft 15, to the inside of the circle whose center is located at the center of the shaft 15. In addition, this embodiment inclines, as shown in FIG. 9, the lift tab 20 upwardly from the proximal end to the surface of the disc 13. The maximum inclination angle is preferably 30° or smaller, because the inclination angle greater than 30° requires a longer lift tab 20 and the slider 19 is likely to vibrate due to its vibration characteristics. Here, FIG. 7 is a schematic sectional view showing the lift tab 20 at the position 20-2 while it is being unloaded. FIG. 7 omits the base 122 etc. shown in FIG. 2. FIG. 8 is a schematic plane view showing a relationship between the ramp 120 and the shaft 15. FIG. 9 is a schematic sectional view showing displacements of the contact position between the lift tab 20 and the ramp 120 as the lift tab 20 moves.

When the lift tab 20 moves from the position 20-2 to the position 20-3 as shown in FIG. 9, the contact position between the ramp 120 and the lift tab 20 displaces from the position 120-2 to the position 120-3 and descends by a vertical distance V2. As discussed, the horizontal distance H1 is expressed as H1=V1/tan θ. When the vertical distance V2 shown in FIG. 9 is considered, the horizontal distance H1 becomes (V1−V2)/tan θ, and reduces by V2/tan θ. The vertical speed of the slider 19 becomes A·tan θ, where A is an in-surface speed of the head at the unloading time. Since the lift tab 20 inclines in this embodiment, the vertical speed of the slider 19 becomes faster than A·tan θ. Thereby, the projection amount of the ramp 120 above the disc 13 reduces, and maintains a wide effective recording area of the disc 13.

Figure 10:
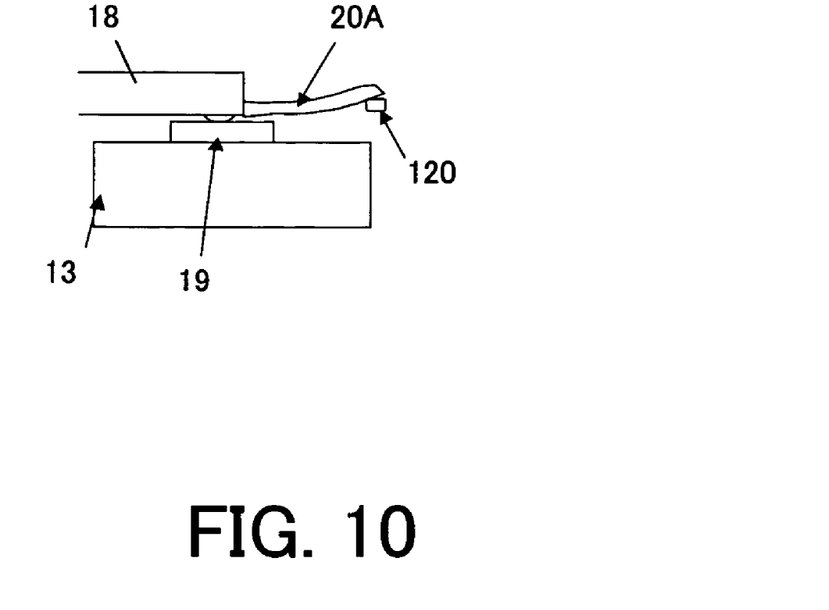
FIG. 10 is a schematic sectional view showing a positional relationship between a variation of the lift tab shown in FIG. 7 and the ramp.

Referring now to FIG. 10, a description will be given of another embodiment of the present invention. FIG. 10 is a schematic sectional view of a lift tab 20A that is located at the position 20-2. The lift tab 20A bends so that a portion of the lift tab 20A closer to the tip of the lift tab 20A goes away from the disc 13. The lift tab 20A located at the position 20-2 first contacts the ramp 120 through its tip. As the suspension 18 further moves to the outer circumference of the disc 13, the contact position moves to the proximal side of the lift tab 20A. Due to the operations similar to those in FIG. 9, this arrangement reduces the projection amount of the ramp 120 above the disc 13, and maintains a wide effective recording area of the disc 13.

This embodiment can also utilize the ramp 120 having the flat part 162 but no inclined part 164. The bending lift tab 20A contacts and goes upon the ramp 120 as the suspension 18 moves in the outer circumference direction of the disc 13. Thereafter, as the suspension 18 further moves in the outer circumferential direction of the disc 13, the slider 19 can be lifted from the disc 13. This embodiment does not require the ramp 120 to have the inclined part 164 that should be formed with precision, facilitates the manufacture, and reduces the cost.

Figure 11:
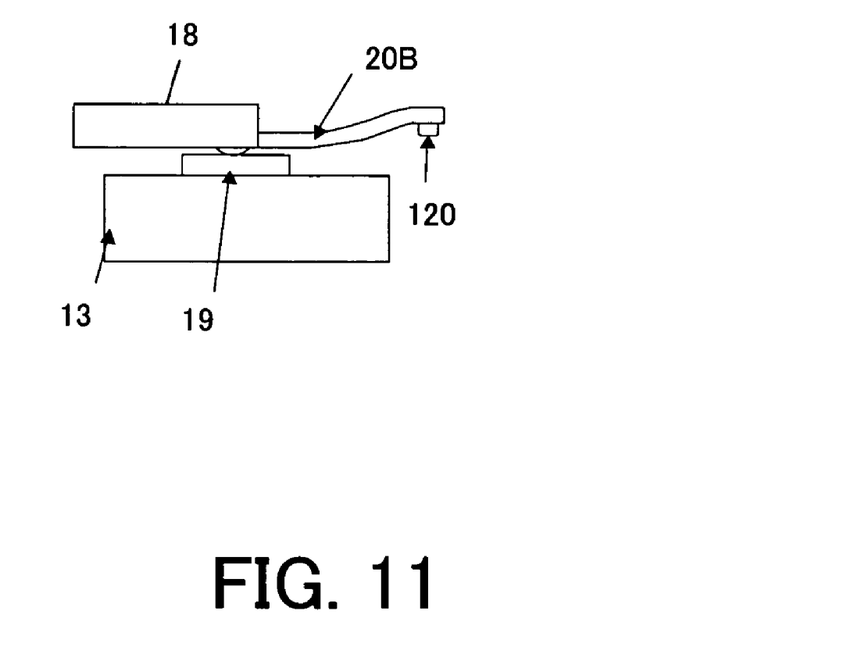
FIG. 11 is a schematic sectional view showing a positional relationship between a variation of the lift tab shown in FIG. 10 and the ramp.

Referring now to FIG. 11, a description will be given of a lift tab 20B as a variation of FIG. 10. Here, FIG. 10 is a schematic sectional view of the lift tab 20B that is located at the position 20-2. The lift tab 20B is similar to lift tab 20A in that the lift tab 20B bends so that a portion of the lift tab 20B closer to the tip of the lift tab 20A goes away from the disc 13, but is different from the lift tab 20A in that the top of the lift tab 20B is parallel to the disc 13 or inclined so that the tip is slightly higher.

Since the lift tab 20B contacts the ramp 120 at its flat or the moderately inclined portion, the lower contact force prevents damages between the lift tab 20B and the ramp 120 when the lift tab 20B contacts the ramp 120 at the position 20-2. In addition, the lift tab 20B stably contacts the ramp 120 and moves up along the ramp 120, preventing initial stick slips and biased abrasions of the ramp 120 and improving the loading and unloading reliabilities. Moreover, the abrasive powder is prevented from dropping on the disc 13 and lowering the recording and reproducing performance.

Figure 12:
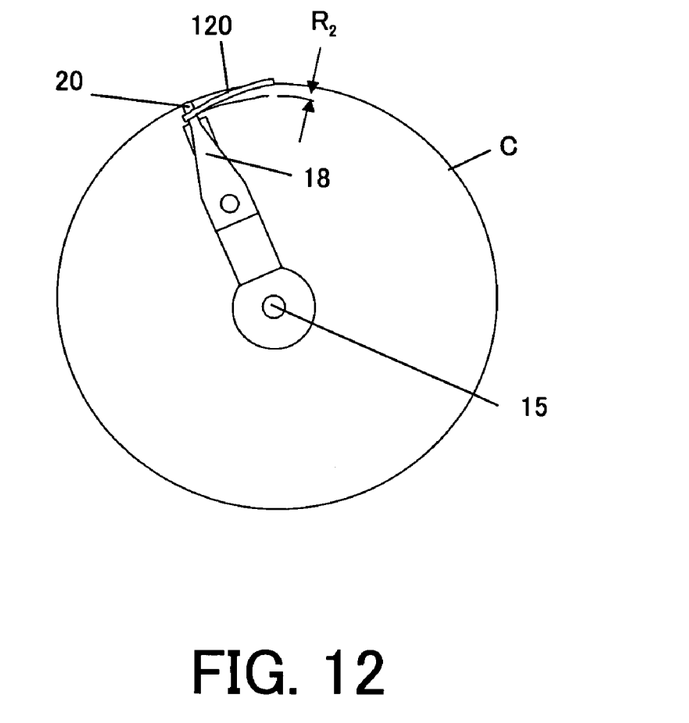
FIG. 12 is a schematic sectional view showing another positional relationship between the ramp and the shaft of the carriage applicable to the HDD shown in FIG. 1.
Figure 13:
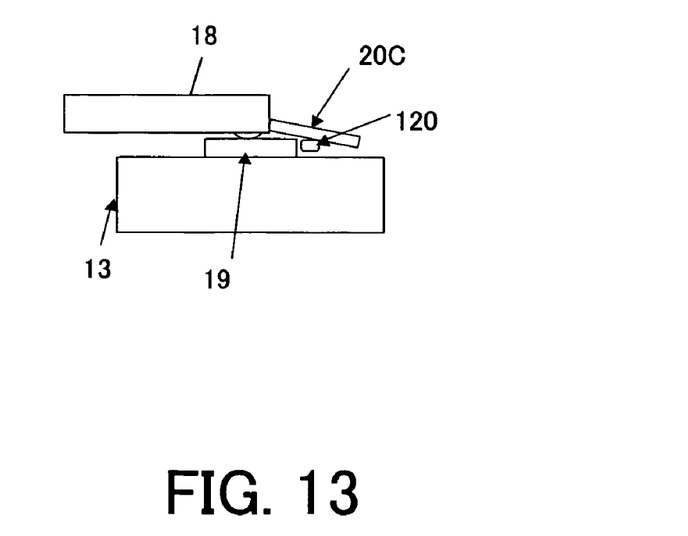
FIG. 13 is a schematic sectional view showing a positional relationship between the ramp shown in FIG. 12 and the lift tab applicable to the ramp.

FIG. 12 is a schematic plane view for explaining still another embodiment of the present invention. This embodiment displaces by $R_2$ the distal end of the ramp 120 to the outside of the circle C whose center is located at the shaft 15, contrary to FIG. 8, and the locus of the contact position between the lift tab 20 and the ramp 120 is shifted from the position 20-2 to the outside of the circle whose center is located at the center of the shaft 15 when the locus is projected onto the plane perpendicular to the shaft 15. In addition, this embodiment inclines the lift tab 20 downwardly from the proximal end toward the surface of the disc 13 as shown in FIG. 13. As the suspension 18 moves to the outer circumference of the disc 13, the contact position between the lift tab 20C and the ramp 120 moves to the tip of the lift tab. Therefore, this embodiment also exhibits operations similar to those in FIG. 9.

As long as the locus of the contact position between the lift tab 20 and the ramp 120 is as shown in FIGS. 8 and 12, the ramp 120 itself may be located on the circumference of the circle C whose center is located at the shaft 15.

Figure 14:
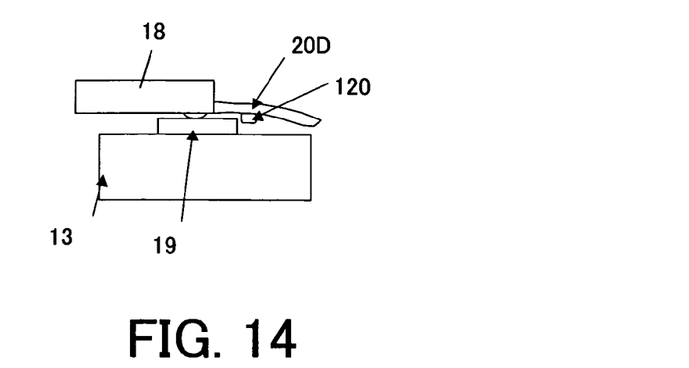
FIG. 14 is a schematic sectional view showing a positional relationship between a variation of the lift tab shown in FIG. 13 and the ramp.

Referring now to FIG. 14, a description will be given of still another embodiment of the present invention. FIG. 14 is a schematic sectional view of a lift tab 20D that is located at the position 20-2. The lift tab 20D operates similar to the lift tab 20A. The lift tab 20D bends so that a portion of the lift tab 20D closer to the tip of the lift tab 20D approaches to the disc 13. An angle between the lift tab 20D and the disc 13 is small at the connection side with the suspension 18, and the angle increases toward its tip. The first contact position between the ramp 120 and the lift tab 20D is located at the connection side between the lift tab 20D and the suspension 18. As the suspension 18 further moves outside the disc 13, it gradually moves to its tip side. This arrangement reduces the projection amount of the ramp 120 above the disc 13, and maintains a wide effective recording area of the disc 13.

One conceivable solution for lifting the slider 19 from the disc 13 within a short moving distance is to increase the inclination angle of the inclined part of the lift tab 20D. However, this would cause in the lift tab 20D to suddenly change the vertical speed, and increase the impact when the lift tab 20D first contacts the ramp 120. As a result, they are likely to get damages. Therefore, the processing that reduces the inclination angle of the inclined part of the lift tab 20D and increases the angle toward its top improves the reliability.

Figure 15:
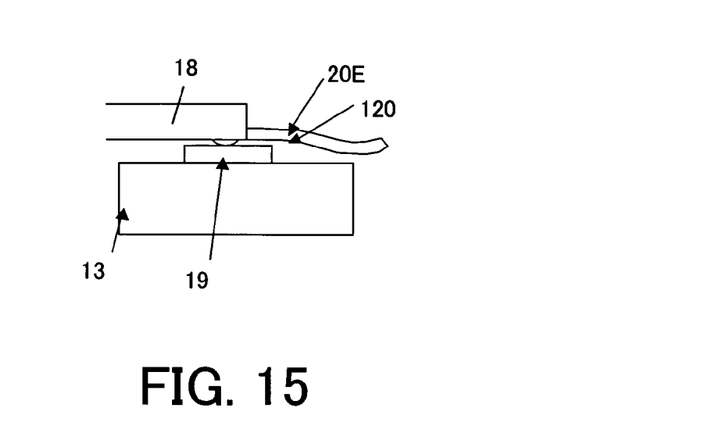
FIG. 15 is a schematic sectional view showing a positional relationship between a variation of the lift tab shown in FIG. 14 and the ramp.

FIG. 15 shows a lift tab 20E as a variation of the lift tab 20D, and the tip of the lift tab 20E bends so that it goes away from the disc 13 toward its tip, preventing a likelihood of collisions due to the reduced clearance from the disc 13.

Figure 16:
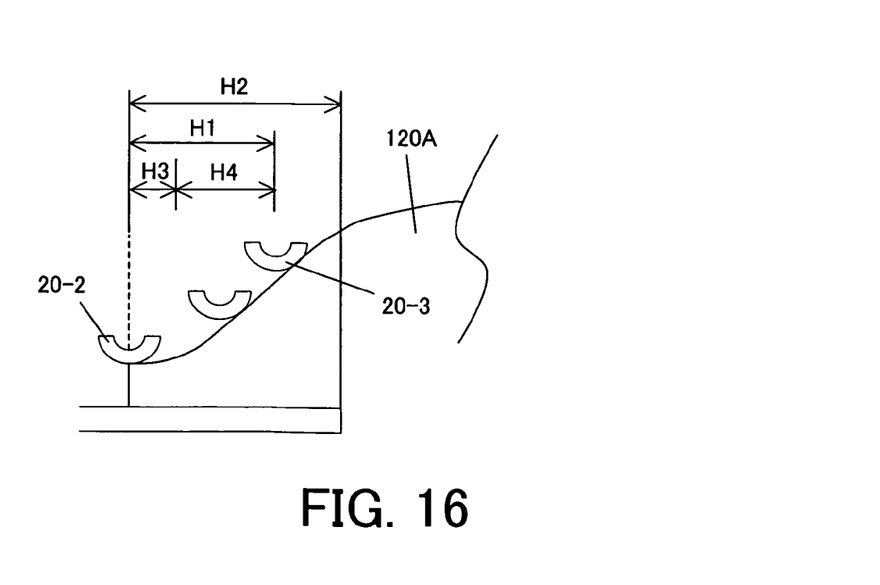
FIG. 16 is a schematic sectional view of a ramp according to another aspect of the present invention.

As discussed, the partially changed inclination angle of the lift tab 20 improves the reliability to the ramp 120 and the lift tab 20. Similar effects are available from the partially changed inclination angle of the ramp 120 so that the angle is small at a position where the lift tab 20 first contacts the ramp 120 in unloading, and then the angle may be increased. If the moderately inclined portion of the lift tab 20 contacts the ramp 120 when the lift tab 20 first contacts the ramp 120, the ramp 120 needs no inclined part and facilitates the manufacture. Conversely, instead of providing the lift tab 20 with the inclination, the inclination of the ramp may be partially changed for similar effects. Thus, the similar effects are available even when the features provided to the lift tab 20 are replaced with the features provided to the ramp 120. For example, as shown in FIG. 16, similar effects to those in the above embodiment are available when the lift tab 20 is made horizontal to the disc 12 in a zone H3 near the position 20-2 and the inclination angle of the ramp 120 in a zone H4 near the position 20-3 is made greater than that in the zone H3.

The inclined part of the ramp 120 and the lift tab 20, when projected onto a plane parallel to their longitudinal directions, may be made of a line, a curve or a combination of plural curves. The maximum inclination angle is preferably 50° or smaller. The typical lift tab 20 is as wide as 0.307 mm and has an outer diameter of 0.2 mm. An inclination angle of the inclined part 164 of the ramp 120 greater than 50° hinders smooth loading and unloading actions due to contacts with the lift tab 20.

The pressure plate 190 projects from the ramp 120, has a prism shape, and includes upper and lower surfaces approximately parallel to a surface of the magnetic disc 13. The pressure plate 190 serves to prevent fluctuations of the slider 19.

The HDD 1 includes, as a control system (not shown) a control part, an interface, a hard disc controller (referred to as "HDC" hereinafter), a write modulation part, a read demodulation part, and a head IC. The control part covers any processor such as a CPU and MPU irrespective of its name, and controls each part in the control system. The interface connects the HDD 1 to an external apparatus, such as a personal computer ("PC" hereinafter) as a host. The HDC sends to the control part data that has been demodulated by the read demodulation part, sends data to the write modulation part. The control part or HDC provides servo control over the spindle motor 14 and (a motor in) the actuator 21. The write modulation part modulates data and supplies data to the head IC, which data has been supplied from the host through the interface and is to be written down onto the magnetic disc 13 by an inductive head. The read demodulation part demodulates data into an original signal by sampling data read from the magnetic disc 13 by the MR head device. The write modulation part and read demodulation part may be recognized as one signal processing part. The head IC serves as a preamplifier.

In operation of the HDD 1, the control part (not shown) drives the spindle motor 14 and rotates the disc 13 in response to an instruction of the host, etc. The control part then controls the actuator 21 and rotates the carriage 16 around the support shaft 15. Initially, the lift tab 20 is held by the holding part 140 in the ramp loading unit 100, but the rotation of the carriage 16 moves the lift tab 20 from the holding part 140 to the sliding surface 160.

Next, the lift tab 20 moves to the disc 13 via the sliding surface 160, and the head 23 is sought onto a target track on the magnetic disc 13. The airflow associated with the rotation of the magnetic disc 13 is introduced between the disc 13 and slider 19, forming a minute air film and thus generating the buoyancy that enables the slider 19 to float over the disc surface. On the other hand, the suspension 18 applies the elastic pressure onto the slider 19 in a direction against the buoyancy of the slider 19. The balance between the buoyancy and the elastic force spaces the slider 19 from the disc 13 by a constant distance.

In a write time, the control part (not shown) receives data from the host through the interface, selects the inductive head device, and sends data to the write modulation part through the HDC. In response, the write modulation part modulates the data, and sends the modulated data to the head IC. The head IC amplifies the modulated data, and then supplies the data as write current to the inductive head device. Thereby, the inductive head device writes down the data onto the target track.

In a read time, the control part (not shown) selects the MR head device, and sends the predetermined sense current to the sense-current control part through the HDC. Data is amplified by the head IC based on the electric resistance of the MR head device varying according to a signal magnetic field, and is then supplied to the read demodulation part to be demodulated to an original signal. The demodulated signal is sent to the host (not shown) through the HDC, control part, and interface.

The instant embodiment reduces the projection amount of the ramp 120 above the disc 13, and maintains a wide effective recording area.

When the read and write end, the control part controls the actuator 21 and rotates the carriage 16 around the support shaft 15 from the inner surface to the outer surface on the magnetic disc 13. Thereby, the lift tab 20 unloads the slider 19 from the disc 13. Due to the adjusted inclination angles of the lift tab 20 and/or the ramp 120, the impact at the contact time is similar to that in the conventional structure. Thereafter, the contact position between the lift tab 20 and the ramp 120 moves so that the slider 19 lifts when the lift tab 20 moves along the sliding surface 160. The distance H1 by which the slider 19 ascends from the disc 13 is shorter than that of the conventional structure. Thereafter, the lift tab 20 is held by the holding part 140. The cover 130 restricts the perpendicular movements of the lift tab 20 in the holding part 140. The pressure plate 190 faces the free end of the suspension 18 with a clearance of about 0.1 mm, and restricts abnormal fluctuations of the suspension 18 or abnormal displacements of the slider 19.

The control part (not shown) controls the spindle motor 14 and stops the rotation of the magnetic disc 13. Unlike the CSS system, the ramp loading system is less likely to cause crashes when driving of the magnetic disc 13 starts, since the frictional force is not applied to the slider 19.

Further, the present invention is not limited to these preferred embodiments, and various modifications and changes may be made in the present invention without departing from the spirit and scope thereof. For example, the number of holding parts 140 and the number of sliding surfaces 160 are variable in the ramp loading unit 100 depending upon the number of discs 13 and the number of sliders 19. A type of the inventive recording medium is not limited to a magnetic disc and the present invention is applicable to an optical disc.

Thus, the present invention can provide a ramp loading unit and a drive having the same, which prevent damages of the ramp and lift tab, and maintain a wide effective recording area on a recording medium.

What is claimed is:

1. A disk drive comprising:
   a recording medium;
   a head support unit that includes a head configured to record information in or reproduce the information from the recording medium, a suspension configured to support the head and rotate around an axis, and a lift tab that is connected to the suspension and inclines relative to a surface of the recording medium when the lift tab is projected onto a first plane parallel to a longitudinal direction of the lift tab; and,
   a ramp loading unit that includes a holding part configured to hold the lift tab outside the recording medium, and a sliding part which the lift tab elastically contacts in loading the head onto the recording medium and in unloading the head from the recording medium,
   wherein said sliding part when projected onto a second plane perpendicular to the axis is so shaped that a locus, which is projected onto the second plane, of a contact position at which the lift tab contacts said sliding part, as the lift tab moves on the sliding surface, shifts from a circle that is set on the second plane and has a center located at the axis and a radius corresponding to a distance on the second plane between the axis and a position at which the lift tab first contacts said sliding part, and
   wherein said sliding part includes an inclined part that projects at least partially above the recording medium, inclines relative to a surface of the recording medium, and partially changes an inclination angle of the inclined part.

2. The disc drive according to claim 1, wherein the inclined part has first and second positions in a direction from the recording medium to said holding part, the first position being closer to the recording medium than the second position, and the inclination angle at the second position being greater than the inclination angle at the first position.

3. The disc drive according to claim 2, wherein the first and second positions are arranged between the position where the lift tab first contacts the sliding part and a position at which the head cannot record the information in or reproduce the information from the recording medium in unloading the head from the recording medium.

4. The disc drive according to claim 1, wherein the sliding part has the inclination angle of about 0° at a position where the lift tab first contacts the sliding part in unloading the head from the recording medium.

5. The disc drive according to claim 1, wherein the inclined part forms a line, a curve or a combination of plural curves when projected onto a plane parallel to a longitudinal direction of the inclined part.

6. The disc drive according to claim 1, wherein the inclined part has a maximum inclination angle of 50° or smaller.

7. The disc drive according to claim 1, wherein said sliding part is flat between the position where the lift tab first contacts said sliding part and a position at which the head cannot record the information in or reproduce the information from the recording medium in unloading the head from the recording medium.

* * * * *